United States Patent Office 3,631,198
Patented Dec. 28, 1971

3,631,198
PREPARATION OF 1,5-DIISOCYANATO-2-
METHYLPENTANE
David Horvitz and Robert J. Shaw, Cincinnati, Ohio, assignors to National Distillers and Chemical Corporation, New York, N.Y.
No Drawing. Filed Sept. 7, 1966, Ser. No. 577,597
Int. Cl. C07c 119/04
U.S. Cl. 260—453 PH                          5 Claims

ABSTRACT OF THE DISCLOSURE

A process is provided for the preparation of 1,5-diisocyanato-2-methylpentane from 1,5-diamino-2-methylpentane, its hydrochloride, carbamate or carbamyl chloride salt thereof, by reaction with phosgene in solution in a lower alkyl ester of phthalic acid as the solvent for the reaction.

This invention relates to a process for the preparation of isocyanates. More particularly, the invention pertains to a process for producing isocyanates from 1,5-diamino-2-methylpentane.

Isocyanates are commonly manufactured by the reaction of primary amines or their hydrochloride or carbamate salts with phosgene. In a frequently employed two-step procedure, the amine is treated with excess phosgene in an inert solvent at relatively low temperatures, 0° to 60° C., to form the carbamyl chloride and hydrochloride of the amine, and then brought to an elevated temperature for a period of time while more phosgene is added. Starting with the hydrochloride or carbamate salt of the amine, the treatment with phosgene is often conducted in a single step at elevated temperature. The latter temperature must be high enough to decompose the carbamyl chloride intermediate which is formed. In general a solvent or diluent is employed to facilitate the reaction, and the primary requirements of the solvent are that it be inert under the reaction conditions and that its boiling point be at least as high as the desired reaction temperature in order to avoid the use of superatmospheric pressures.

It is also preferred to use a liquid in which the amine salts are soluble, if possible, since this permits a faster reaction.

The temperature of reaction required varies with the amine that is being phosgenated. For example, tris-(p-aminophenyl) methane was phosgenated at an ultimate temperature of 105°–110° C. [Siefken, Ann. 562, 75–136 (1949)]; toluene diamine has been phosgenated at temperatures up to 140° C. (U.S. Pat. 2,908,704), to 160° C. (Brit. Pat. 806,903); to 170° C. (U.S. Pat. 2,875,225), and to 190° C.–200° C. (U.S. Pat. 2,680,130); while hexamethylene diamine has been phosgenated at 160° to 165° C. (U.S. Pat. 2,847,440), at 180°–185° C. (Organic Synthesis, Vol. 31, p. 62, John Wiley and Sons, Inc., New York, 1951), at 190°–195° C. [Siefken, Ann, 562, 75–136 (1949)]. At the same time, for any particular amine, as shown above, a considerable variation in the temperatures used can be observed.

It is commonly accepted that the diisocyanates that are formed should not be held at excessive temperatures for longer periods than necessary, since it is possible for degradative reactions to occur, particularly polymerization. However, the stabilities of different diisocyanates can vary widely. In the Siefken reference hexamethylene diamine dihydrochloride was phosgenated in o-dichlorobenzene for 18 hours at 190°–195° C. and still a 95% yield of the diisocyanate was obtained. In the Organic Synthesis reference hexamethylene diamine dihydrochloride was phosgenated at 180°–185° C. for 8 to 15 hours and yields of 84 to 95% were obtained. However, the latter reference warns that a similar reaction at 206° C. did lead to 84% of polymer.

Nevertheless, it is evident that with a wide variety of solvents and diluents and with a broad range of temperatures high yields of diisocyanate can be obtained in many cases.

The present invention is concerned with the manufacture of 1,5 - diisocyanato-2-methylpentane from 1,5-diamino-2-methylpentane, its hydrochloride, carbamate or carbamyl chloride salts or mixtures thereof by treatment with phosgene. Unlike those discussed above, this diisocyanate is rapidly degraded under the usual phosgenation conditions. For example, employing conditions which give high yields in the production of hexamethylene diisocyanate, there were obtained in o-dichlorobenzene at reflux (176° C.) a 19% yield of 1,5-diisocyanato-2-methylpentane; at 170° C. a 43% yield; and at 160° C. a 50% yield. At lower temperatures the reaction rate was extremely slow and did not further improve the yield. Large amounts of insoluble polymer products were also formed. The use of 1,5-diamino-2-methylpentane for the preparation of the isocyanate is described in Chemical and Engineering News, Feb. 22, 1965, pp. 37–8.

In amylbenzene at reflux (186° C.) a yield of 32% of 1,5-diisocyanato-2-methylpentane was achieved, and at lower temperatures the reaction rates were extremely slow with a maximum yield of 34%. A similar reaction was conducted with hexamethylene diamine in amylbenzene at reflux and a 96.7% yield of hexamethylene diisocyanate was obtained without difficulty.

The phosgenation of 1,5-diamino-2-methylpentane was performed also in acetophenone as solvent, following a procedure recommended in U.S. Pat. No. 2,847,440 for the manufacture of hexamethylene diisocyanate but only a 27% yield was obtained. A reaction was also attempted in isobutylbutyrate at reflux (155° C.) but only a very slow reaction occurred. After 18% of the theoretical amount of hydrogen chloride had evolved there was found only a 0.4% yield of diisocyanate.

It has now been found that when phthalate esters were employed as reaction solvents there was a marked improvement in yield of 1,5-diisocyanato-2-methylpentane up to values of 75 to 82%. Furthermore, the solids formed were very slight in amount compared to the large quantities of polymeric solids observed with other solvents. It was also found to be important to maintain close control of temperature in order to achieve the desired results. At 145° C. the reaction proceeds at a very slow rate, but the rate of degradation of the diisocyanate is correspondingly slow, so that an ultimate yield of 80–82% can be obtained, even though the reaction is complete only in about 25 hours. On the other hand, at 155° C. the rate of reaction is greatly accelerated so that it is complete in 7.5 to 8.5 hours, but it is necessary to stop the reaction when the optimum yield is reached because further heating results in rapid decline of yield. Higher temperatures may also be used, but it is then even more critical to stop the reaction at the optimum point. The preferred reaction temperature is in the range of about 150° to 160° C., although temperatures ranging from 135° to 190° C. may be used. Thus, the time of reaction is related to the temperature used as well as to other conditions such as efficiency of mixing, rate of flow of phosgene, and configuration of equipment. The preferred time of reaction will range from about 5 to 12 hours, although it may be as high as 25 hours, depending on the temperature used and other conditions aforesaid.

The amount of phosgene used in the reaction may vary from 2 to 6 times that theoretically required, although an optimum rate of phosgene input is such that the total phosgene added is equal to 3 to 5 times that theoretically required. The excess phosgene may be recovered.

Lower alkyl esters of phthalic acid, wherein the alkyl ester groups may be the same or different and wherein the alkyl substituent contains from 1 to 4 carbon atoms, have been found to be particularly useful as reaction solvents for practicing the process of this invention. Suitable esters include, for example, dimethylphthalate, diethylphthalate, dibutylphthalate, methylethylphthalate, ethylbutylphthalate, and the like as well as mixtures thereof. The amount of phthalate ester employed is not critical and need only be sufficient to avoid any deleterious side reactions caused by a high concentration of the amine starting material. In general, the amount of phthalate ester employed will be sufficient to produce an 0.25 to 2.5 molar, and preferably an 0.5 to 1.5 molar, solution of the amine.

The reaction may be conducted by a two-step procedure in which the amine is treated with phosgene first at low temperatures, and then with more phosgene at elevated temperature; or it may be conducted in a single-step process in which the amine hydrochloride or carbamate is treated with phosgene at elevated temperature.

In the two-step process one part of 1,5-diamino-2-methylpentane is added over a period of 30 to 60 minutes to a solution of 0.85 to 1.3 parts of phosgene in 5 to 10 parts of phthalate ester at a temperature of 0° to 50° C. A reflux condenser cooled to 0° C. will prevent loss of phosgene at this stage. After all the amine has been added, the solution is brought to 135° to 190° C., but preferably to 150° to 160° C., while additional phosgene is passed into the solution. The further amount of phosgene added should be such that the total phosgene employed in the reaction will be in the range of 3.4 to 10.2 parts, with a preferred range of 5.0 to 8.5 parts. In the temperature range of 150° to 160° C., this reaction will be complete in 5 to 12 hours. Because the time of heating is important it is advisable to follow the extent of reaction by some means. For example, the amount of hydrogen chloride, after separation from the excess phosgene, may be measured, or the concentration of diisocyanate may be determined from time to time by gas-liquid chromatography. As soon as it is observed that the concentration of product is no longer increasing or is increasing extremely slowly, or when the rate of hydrogen chloride evolution has decreased sharply, the phosgene feed is stopped and nitrogen or any other inert gas is blown through the solution for 10 to 15 minutes before cooling.

The reaction mixture contains very little solids which can be separated simply by pouring off the solution. The diisocyanate can be obtained in a high degree of purity (99 to 100%) by fractional distillation at reduced pressure. The pressure should be low enough so that the temperature of the pot liquid does not exceed 145° C., and preferably does not exceed 135° C.

In the single-step process, 2 to 6 parts (preferably 3.0 to 5.2 parts) of phosgene are passed through a mixture of one part of the dihydrochloride or carbamate salt of 1,5-diamino-2-methylpentane in 3 to 6 parts of phthalate ester. The reaction temperature may be 135° to 190° C., but the preferred range is 150° to 160° C. In the latter range the reaction will be complete in 6 to 14 hours. It is desirable to follow the course of reaction, such as described above, in order to achieve maximum yield. The product may be isolated as already described.

The process of the invention will be more fully understood by reference to the following illustrative embodiments.

EXAMPLE I

Run A

The equipment consisted of a 250 ml. round-bottom, 3-necked flask fitted with gas-inlet tube, water-cooled condenser, thermometer and mechanical stirring. Into the flask were placed 23.6 g. (0.125 mole) of 1,5-diamino-2-methylpentane dihydrochloride and 125 ml. of o-dichlorobenzene. The mixture was brought to reflux and phosgene was passed through the solution at a rate of 33 cc./minute. The temperature of the refluxing mixture was 176° C. The mixture was treated thus for 10½ hours, at which time the rate of hydrogen chloride evolution had become very slow. The mixture was flushed with dry nitrogen for about 15 minutes and then cooled. A considerable amount of tacky solid was found in the flask. A titration of the solution for isocyanate content showed a yield of 1,5-diisocyanate-2-methyl-pentane of 18.8% based on the diamine dihydrochloride. Analysis of the product by mass spectrograph and infrared spectrography showed it to be 1,5-diisocyanato-2-methylpentane. The titrimetric method involves the addition of an excess of a secondary amine, followed by a back-titration with acid.

Run B

A reaction was carried out under the conditions of Run A except that the temperature was maintained at about 170° C., and the reaction time was 9 hours. The reaction mixture contained a large amount of tacky solids this time also, but the yield of diisocyanate was found to be 43.2% of theoretical.

Run C

The apparatus described in Run A was used, but it was modified so that a tube from the top of the water condenser led into a Dry Ice cooled trap containing 100 mls. of toluene and following this was a trap at 0° C. containing water. In this way the excess phosgene was trapped in the toluene solution and most of the hydrogen chloride was trapped in the water. The rate and extent of reaction could be followed by measuring the evolution of hydrogen chloride. Furthermore, in this reaction samples of the reaction mixture were withdrawn from time to time for analysis by gas liquid chromatography (GLC).

The materials and quantities used were the same as in Run A but the reaction was started at 130° C. The rate of hydrogen chloride evolution was found to be extremely slow and the temperature was raised to 150° C. The rate of hydrogen chloride evolution was thereby increased but it was still slow and at the end of the 6th hour the temperature was raised to 160° C. The rate of hydrogen chloride evolution increased but after a total of 11 hours it decreased greatly and at the end of 13 hours the reaction was terminated. The reaction mixture was full of viscous solid at this point and stirring was difficult. Analysis of the product by GLC indicated a 50.6% yield of diisocyanate.

Run D

A reaction was run as in Run A except that 125 mls. of amylbenzene was used as solvent instead of o-dichlorobenzene. The reaction was run at reflux (183° C.) for 7 hours, at which time a large amount of tacky solid had formed with resultant difficulty in stirring. Analysis of the solution by titration showed a 32.1% yield of diisocyanate.

Run E

A reaction was run as in Run C, except that 125 mls. of amylbenzene was used as solvent instead of o-dichlorobenzene. The reaction was held at 150° C. for 2 hours, at 162° C. for one hour, at 175° C. for 2 hours and finally at 165° C. for four hours. The total reaction time was 9 hours. The rate of hydrogen chloride evolution was slow at all temperatures tried and the final product was full of tacky solid. Analysis by GLC showed a yield of 34.2% of diisocyanate.

Run F

The apparatus was similar to that used in Run A. Into the flask were placed 100 mls. of acetophenone and 14.5 g. (0.125 mole) of 1,5-diamino-2-methylpentane. The system was purged with carbon dioxide gas and then carbon dioxide was allowed to be absorbed by the stirred reaction mixture at ambient temperature. The solid white carbamate separated from solution. When this reaction was finished the mixture was brought to 160°–165° C., while phosgene was passed through at a rate of 60 cc./minute. At the elevated temperature the solids went into solution and the reaction was continued for 7½ hours. The reaction was continued for this length of time because it was observed that hydrogen chloride was being evolved at an appreciable rate. The yield of diisocyanate was found to be 27% of theoretical.

Run G

The apparatus used was similar to that in Run C. Into the reaction flask were placed 125 mls. of isobutylbutyrate and 23.6 g. (0.125 mole) 1,5-diamino-2-methylpentane dihydrochloride. The reaction was brought to reflux temperature (155° C.) while phosgene was introduced at a rate of 60 cc./minute. At the end of three hours it was found that about 18% of the theoretical amount of hydrogen chloride has been evolved, but the yield of diisocyanate at this point was only 0.4%. The reaction was discontinued.

EXAMPLE II

The apparatus used was similar to that in Example I (Run C). Diethylphthalate (125 mls.) was put into the reaction flask and 23.6 g. (0.125 mole) of 1,5-diamino-2-methylpentane dihydrochloride added. The temperature was brought to 125° C. and the phosgene was fed in at a rate of 60 cc./min. The hydrogen chloride evolution was extremely slow and at the end of 3 hours the temperature was raised to 135° C. Since the hydrogen chloride evolution was still very slow, after 2 more hours the temperature was raised to 145° C. where it was maintained for 24 hours longer (total time, 29 hours). It was found that at the end of the 25th hour the yield of diisocyanate (by GLC) had reached a peak of 82.7%. At the end of 27 hours the yield had declined to 77.8% and at the end of 29 hours it had reached 72.0%. It was also noted that the rate of hydrogen chloride evolution had dropped sharply after the 25th hour.

The reaction mixture was found to contain only a slight amount of solid at the end of the reaction.

EXAMPLE III

A reaction similar to that of Example II was performed, except that the reaction temperature was brought to 155° C. and maintained at that point, and the reaction was continued for 9 hours. The reaction mixture was finally flushed with nitrogen and cooled. Analyses of samples by GLC during the course of reaction showed the following yields of diisocyanate.

| Hours of reaction: | Percent yield |
|---|---|
| 2 | 28.4 |
| 4 | 55.2 |
| 5 | 64.4 |
| 7 | 73.4 |
| 8 | 81.0 |
| 9 | 75.6 |

The results show a maximum yield at about 8 hours, with a decline in yield on continued reaction. An analysis by titration of the final reaction product showed a yield of 75.5%, in agreement with the GLC value.

The product from this run was combined with product from two similar runs and distilled without a fractionating column at 2.5 mm. Hg and a fraction boiling between 97° and 124° C. was taken over. This distillate was fractioned through a short column packed with glass helices and a fraction boiling at 96°–97° at 2.5 mm. Hg was removed. Analysis of the clear, colorless liquid by titration showed it to be 99.5% pure diisocyanate.

The above data show that the process of this invention can be effectively utilized to prepare high yields of 1,5-diisocyanato-2-methylpentane from 1,5-diamino-2-methylpentane. In contrast, when known processes for the preparation of isocyanates are employed, the yields are below economically attractive levels and increased amounts of undesirable by-products are encountered.

While particular embodiments of this invention are shown above, it will be understood that the invention is obviously subject to variations and modifications without departing from its broader aspects. The diisocyanate products are useful for the manufacture of polyurethanes in accordance with well-known technology.

What is claimed is:

1. A process for the preparation of 1,5-diisocyanato-2-methylpentane which comprises reacting 1,5-diamino-2-methylpentane or the hydrochloride or carbamate or carbamyl chloride salt thereof with phosgene in solution in a lower alkyl ester of phthalic acid as the solvent for the reaction at a temperature within the range from about 135 to about 190° C., and recovering 1,5-diisocyanato-2-methylpentane.

2. A process in accordance with claim 1 in which the 1,5-diamino-2-methylpentane is the 1,5-diamino-2-methylpentane dihydrochloride.

3. A process in accordance with claim 1, in which the lower alkyl ester of phthalic acid is diethyl phthalate.

4. A process in accordance with claim 1, in which the reaction is carried out at a temperature within the range from about 150 to about 160° C.

5. A process in accordance with claim 1, in which the amount of lower alkyl ester of phthalic acid is sufficient to produce a 0.25 to 2.5 molar solution of the 1,5-diamino-2-methylpentane.

References Cited

UNITED STATES PATENTS

| 3,014,942 | 12/1961 | Vaganay et al. | 260—453 |
| 3,234,253 | 2/1966 | Cooper | 260—453 |
| 3,388,145 | 6/1968 | Mertz | 260—453 |

CHARLES B. PARKER, Primary Examiner

D. H. TORRENCE, Assistant Examiner

U.S. Cl. X.R.

260—453 AL, 583 P